United States Patent
Spencer (10) Patent No.: US 10,534,516 B2
(45) Date of Patent: Jan. 14, 2020

(54) USER INTERACTION METHOD FOR INPUT SELECTION

(71) Applicant: Michael David Spencer, Cambridgeshire (GB)

(72) Inventor: Michael David Spencer, Cambridgeshire (GB)

( * ) Notice: Subject to any disclaimer, the term of this patent is extended or adjusted under 35 U.S.C. 154(b) by 70 days.

(21) Appl. No.: 13/967,483

(22) Filed: Aug. 15, 2013

(65) Prior Publication Data

US 2014/0053106 A1    Feb. 20, 2014

(51) Int. Cl.
*G06F 3/0484* (2013.01)
*G06F 3/0488* (2013.01)
*G06F 3/0482* (2013.01)

(52) U.S. Cl.
CPC ........ *G06F 3/04842* (2013.01); *G06F 3/0482* (2013.01); *G06F 3/0488* (2013.01); *G06F 3/04886* (2013.01)

(58) Field of Classification Search
CPC ..... G06F 3/0482; G06F 3/488; G06F 3/04842
USPC ........................................................ 715/813
See application file for complete search history.

(56) References Cited

U.S. PATENT DOCUMENTS

| | | | |
|---|---|---|---|
| 6,462,752 B1* | 10/2002 | Ma et al. | 345/684 |
| 2011/0047461 A1* | 2/2011 | Bargmann | G06F 9/451 715/702 |
| 2011/0314190 A1* | 12/2011 | Tanaka | 710/52 |
| 2012/0169646 A1* | 7/2012 | Berkes et al. | 345/174 |
| 2012/0218190 A1* | 8/2012 | Pechanec et al. | 345/173 |
| 2013/0007666 A1* | 1/2013 | Song et al. | 715/835 |
| 2014/0053111 A1* | 2/2014 | Beckman | G06F 3/04812 715/856 |

FOREIGN PATENT DOCUMENTS

| | | |
|---|---|---|
| GB | 2352153 A | 1/2001 |
| JP | 50298050 A | 11/1993 |

* cited by examiner

*Primary Examiner* — Ryan Barrett
*Assistant Examiner* — Parmanand D Patel
(74) *Attorney, Agent, or Firm* — Kirschstein, Israel, Schiffmiller & Pieroni, P.C.

(57) ABSTRACT

Usability of a device having a user interface that contains a plurality of user-selectable elements presented in a spatial arrangement that varies over time is improved by storing the spatial arrangement at an initial given time in a memory and, upon receiving user input at a later time, applying the user input denoting a selection within the spatial arrangement at the initial given time stored in the memory, in order to achieve the automatic selection of the element that existed at the selected location within the arrangement at a period of time before the selection was made, rather than the selection of the element that exists within the arrangement at the actual time of the selection being made.

10 Claims, 5 Drawing Sheets

USER INTERACTION METHOD FOR INPUT SELECTION

FIELD OF THE DISCLOSURE

The present invention generally relates to handheld, telecommunications or other electronic devices configured and programmed to execute internet browsers or other programs or applications, wherein a user is required to make a selection, and to methods of, and arrangements for, improving the usability or accessibility of such devices.

BACKGROUND OF THE DISCLOSURE

Internet browsers are known in the art. Such browsers are commonly used in personal computers, tablet computers and mobile telephones. With the advent of mobile telephones that integrate internet communication within a handheld telephone, internet browsers are increasingly in use in mobile telephones.

The interaction of a user with an internet browser typically involves the user viewing an internet page presented on the screen of a computer or a mobile telephone, wherein the page comprises elements that may include text and/or graphical information. In addition, internet pages often contain elements referred to as hyperlinks, which enable the user to visit another internet page by selecting the hyperlink (for example, by the click of a computer mouse). The hyperlink usually is visually represented by a text or graphical element. The hyperlink may be selected by a computer mouse click. However, with the advent of touch sensitive screens that are widely used in mobile telephones and tablet computers, the selection of hyperlinks is often achieved through the touch of a finger on the screen, or via the touch of a stylus on the screen.

A typical user experience with an internet browser would therefore involve the user navigating to a particular internet page, which would initially be displayed as a blank page, with the various text and graphical elements subsequently appearing within the page once they are, individually, downloaded to the device via the internet. Because of the need to download these elements, it is often the case that the various graphical elements (which may be of a considerable file size) will appear on the screen, sometimes one by one, over the course of a period of time. This period of time is dependent on factors including the speed of the internet connection and the file size of the graphical elements. In practice, this time period is often 5-10 seconds (or more) in duration.

One problem with many such prior art arrangements stems from the fact that, prior to the downloading of these graphical elements, the spacing that they will eventually occupy on the display screen is not reserved, but may be occupied by elements that have downloaded fastest. For this reason, as the internet page loads, the appearance of additional graphical elements causes a rearrangement of the text and graphical elements already displayed on the screen. This typically involves a downward displacement of any content that is below the specified position of the graphical element. For example, consider the situation where an internet page comprises a list, wherein each item on the list is indicated by a quantity of text (such as the titles of various items for purchase) and also by a graphical element (such as a picture of each item for sale). As this hypothetical page loads, the first elements to appear would typically be the text. As each individual image subsequently downloads and is rendered on the display, the distance between consecutive items within the list typically increases, because of the appearance of the images. Where a page has a large number of such images as part of a list (such as on an internet auction website), the process of downloading of images and consequent rearrangement of the visual elements within the display can take a considerable length of time.

In the above example, many of these visual elements (text and/or images) would be hyperlinks, i.e., elements that the user is required to select in order to visit a desired internet page. The rearrangement of visual elements during download of the internet page therefore gives rise to a particular problem, wherein a user may bring their finger to touch the screen to select a particular hyperlink, but will find instead that in the time it has taken for their finger to reach the screen, a rearrangement has taken place such that their finger touches a hyperlink that they did not intend to touch. This gives rise to the navigation to an internet page that the user did not intend to visit (or the execution of a command or downloading of a file, in the case of selecting certain page elements that are programmed to initiate such events), which may have a range of undesirable consequences. The most harmless (albeit undesirable) consequences include the frustration and unnecessary use of time in needing to navigate back to the original page, waiting for it to fully reload, before making the correct selection. More serious consequences, however, include the downloading of undesirable internet content, the unintended completion of an internet purchase, or the purchase of an unintended item or service.

Numerous internet browsers have been provided in the prior art. While these internet browsers may be suitable for the particular purpose of viewing internet pages, these browsers only allow for accurate selection of hyperlinks if care is taken to allow sufficient time to elapse in order to enable all elements within an internet page to fully download.

To fully understand the cause of this problem with the prior art arrangements, one must consider the neuropsychological mechanisms underpinning the commission and control of a motor action by the human brain. This involves a multi-step process, wherein visual information is received and processed, and a judgment is made as to whether to perform a motor action. The commissioning of a motor action involves an interaction between a network of brain areas, including the frontal cortex (which has a role in decision making), the basal ganglia (which have a role in the control of movements) and the motor cortex (which contains motor connections that ultimately extend to the various muscles within the body). Once a motor action has been commissioned but has not yet been performed, a brief period of time exists within which the brain retains the ability to abort or modify the action if the circumstances requiring it change. However, there is a subsequent period of time within which the brain is unable to abort or modify the action, even if such a change were required. In neuropsychological experiments, this phenomenon is measured as the "stop-signal-reaction-time".

For this reason, the brain is unable to abort or modify the motor action it has initiated to select a hyperlink once this "point of no return" has been reached. Should the hyperlink be displaced downward on the screen and replaced by an undesired hyperlink prior to the contact of the finger with the screen, then the user will be unable to inhibit their motor action resulting in the wrong internet page being visited.

Several further circumstances can compound this problem. Firstly, the problem is greater with motor actions that involve a larger distance of movement of the finger (such as the touching of a finger onto a screen) as compared to movements over a smaller distance (such as the pressing of a mouse button). Clearly as smartphones and touch sensitive computer tablets become more prevalent, this problem will become more prevalent. Secondly, where the user has difficulties with mobility, either due to disability or due to the natural process of lengthening of reaction times that occurs with ageing (a population that finds increasing importance in the use of mobile telephones and the internet), in these circumstances the problem is dramatically more marked.

An additional compounding factor that causes this problem to be particularly marked in some prior art arrangements is that the functioning of internet browsers is inherently susceptible to delays due to bandwidth constraints affecting the ability of the user to download data or of the host sever to serve data. A particularly prevalent reason for such bandwidth constraints is the fact that, when internet browsers operate from mobile devices they often download data via the means of a cellular radio telephony connection, the download speed of which is heavily dependent upon cellular signal strength. Paradoxically, the stated and intended use of mobile devices in enabling cellular communication in non-fixed locations, therefore is seen to be the same factor that is directly associated with increasing affectation by the problems, stated above, with the prior art arrangements.

SUMMARY OF THE DISCLOSURE

Having identified the previously described problems associated with various prior art arrangements for viewing and selecting page elements in internet browsers, the present applicant has developed a feature which solves all these problems, which is also applicable to other software and device platforms involving user interfaces wherein presently the same problem can occur.

According to a first aspect of the present invention there is provided a method of, and an arrangement for, improving the usability or accessibility of a device, the device having a user interface, the user interface containing a plurality of user-selectable elements presented in a spatial arrangement, and the spatial arrangement varying over time. The spatial arrangement of the elements is stored in a memory at an initial given time. Upon receiving user input at a later time, and under the control of a programmed controller or microprocessor, the method is performed by applying the user input denoting a selection within the spatial arrangement as at the initial given time stored in the memory, in order to achieve the automatic selection of the element that existed at the selected location within the spatial arrangement at a period of time before the selection was made, rather than the selection of the element that exists within the spatial arrangement at the actual time of the selection being made.

According to one embodiment, the selection of such "previously correct" elements (i.e., elements that existed at the user's selected location at a period of time before the user's selection was made, rather than the selection of elements that exist at the actual time of the selection being made) is achieved by the programmed controller of the computer retaining information as to the appearance of the display at a previous point in time defined by an offset duration, with this information being continuously updated and replaced.

The aforementioned feature of the present invention is not only capable of but indeed is specifically adapted to provide for a time correction in order to ensure that a user who makes a selection onto a touch sensitive screen (or via a mouse click depending on the specific device) will visit the internet page that they intended to visit, rather than following the hyperlink that happens to be at the location on the screen that their finger touches at the time that their finger touches the screen.

According to certain embodiments, the determination of the duration of the time correction is achieved by means of a default configuration that is pre-set to a typical reaction-time duration, such as to be useful to the greatest number of users with the minimum of setup requirements.

Preferably, there is provided a time correction, wherein the duration of the time correction is modified by the user to a desired value, in order to take into account their individual reaction time and mobility requirements.

According to another preferable embodiment, there is provided a time correction, wherein adjustment of the time correction is achieved using a slider control displayed on the computer screen.

According to certain embodiments, there is provided a time correction wherein adjustment of the time correction is achieved by the device performing an estimation of the user's optimum time correction setting, such as through an on-going process of monitoring the user's performance or by the provision of a configuration utility designed to measure the user's reaction time.

According to another aspect of the present invention, there is provided a time correction that is ideally suited to being included as a feature within other functions of the telephone or computer that depend on the user performing a selection of an item on a visual display by means of a motor action, such as the selection of items on screen within an email application, a telephone conversation application, a game application, or another application.

According to yet another aspect of the present invention, there is provided a time correction that is ideally suited to being included as a feature within other devices that require selections to be made by means of a motor action. These other devices may include other handheld devices and wall mounted display screens, in addition to other devices wherein a selection is made by means of a motor action within an area of free space rather than onto a display screen (such as the selection of a location within a holographically projected display).

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural or functional changes may be made without departing from the scope of the invention.

In the accompanying drawings, like reference characters designate the same or similar parts throughout the several figures.

The following detailed description is, therefore, not to be taken in a limiting sense, and the scope of the present invention is best defined by the appended claims.

BRIEF DESCRIPTION OF THE DRAWINGS

Embodiments of the present invention will now be described in further detail by way of example only, with reference to the accompanying drawings in which.

DETAILED DESCRIPTION

The following discussion describes in detail an embodiment of the invention and several variations of that embodiment. This discussion should not be construed, however, as limiting the invention to those particular embodiments since practitioners skilled in the art will recognize numerous other embodiments as well. For a definition of the complete scope of the invention, the reader is directed to the appended claims.

Figure 1:
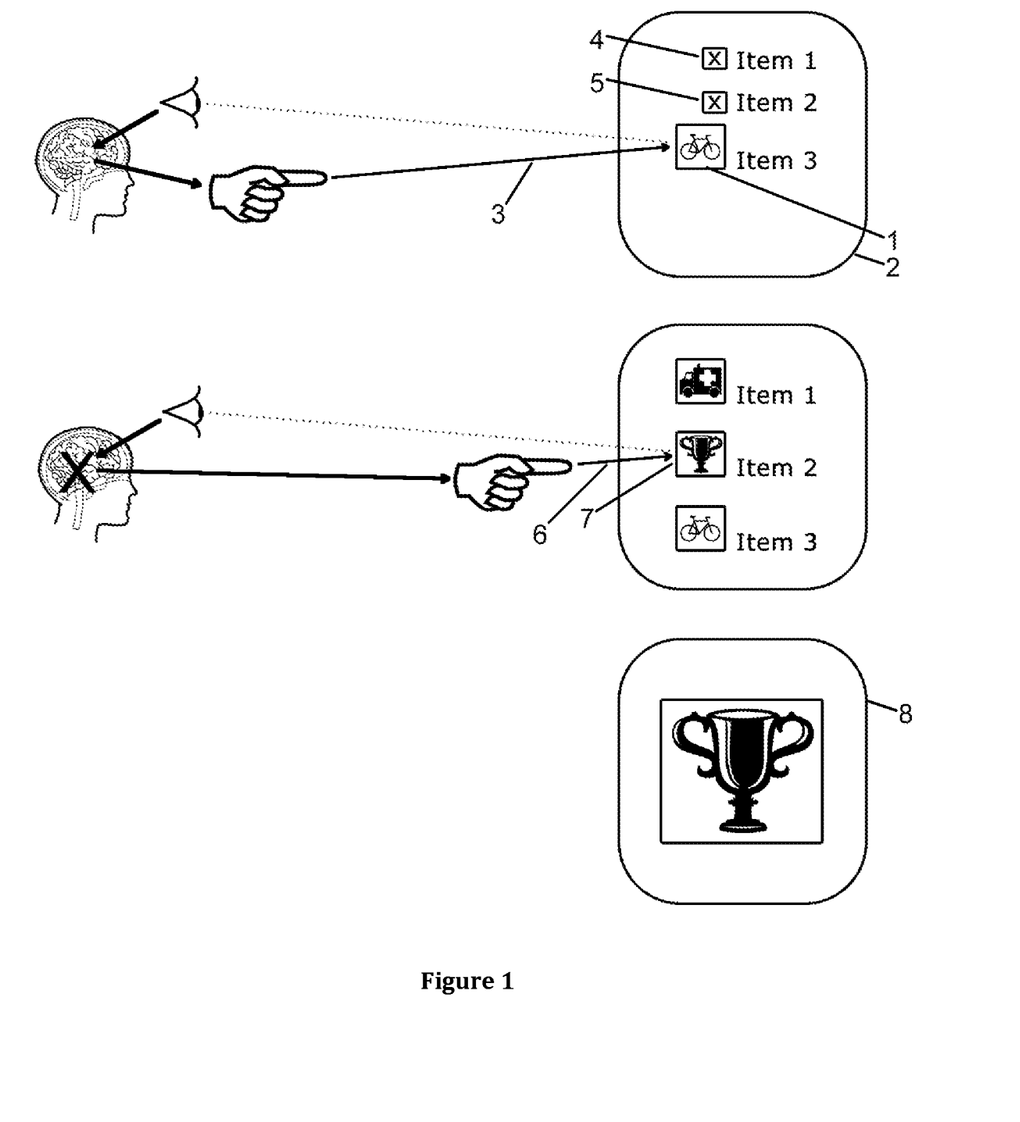
FIG. 1 shows the motor selection of an undesired hyperlink caused by the rearrangement of visual elements on a display due to the downloading of a graphical element.

Turning to FIG. 1, shown therein is an illustration of the problem for which the present invention corrects, wherein the user views an item 1 on a display screen 2. They wish to select it by means of a finger touch, and therefore initiate a motor action of their finger along an intended path of travel 3. Before their finger touches the screen, additional images 4, 5 (that had not downloaded when the motor action was initiated) are displayed on the screen, thus displacing the desired element 1. The user, while able to see that the object has moved, is no longer able to inhibit or modify their motor action, which proceeds along the previously intended path of travel 6, resulting in the selection of undesired element 7. Consequently, without the invention, the user would navigate to undesired internet page 8.

Figure 2:
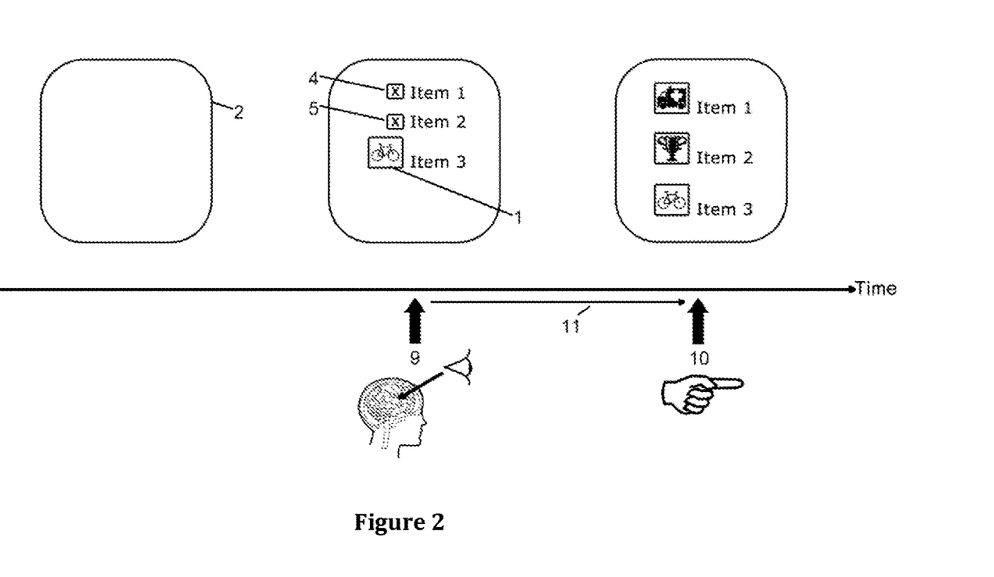
FIG. 2 shows an illustration of a time delay for which correction is required.

Turning to FIG. 2, shown therein is a further illustration of the problem for which the present invention corrects, wherein page elements such as images and text appear on a display screen 2 as they download and are rendered, causing rearrangement of the other elements within the display due to the size of the images. The user views an item 1 on the display screen at time-point 9. They wish to select it by means of a finger touch, and therefore initiate a motor action. Before their finger touches the screen at time-point 10, additional images 4, 5 (that had not downloaded when the motor action was initiated) are displayed on the screen, thus displacing the desired element 1. The user, while able to see that the object has moved, is no longer able to inhibit or modify their motor action. The time lag 11 between initiation of the motor action and its completion in touching the display screen represents a preferred duration for the time correction disclosed herein.

Figure 3:
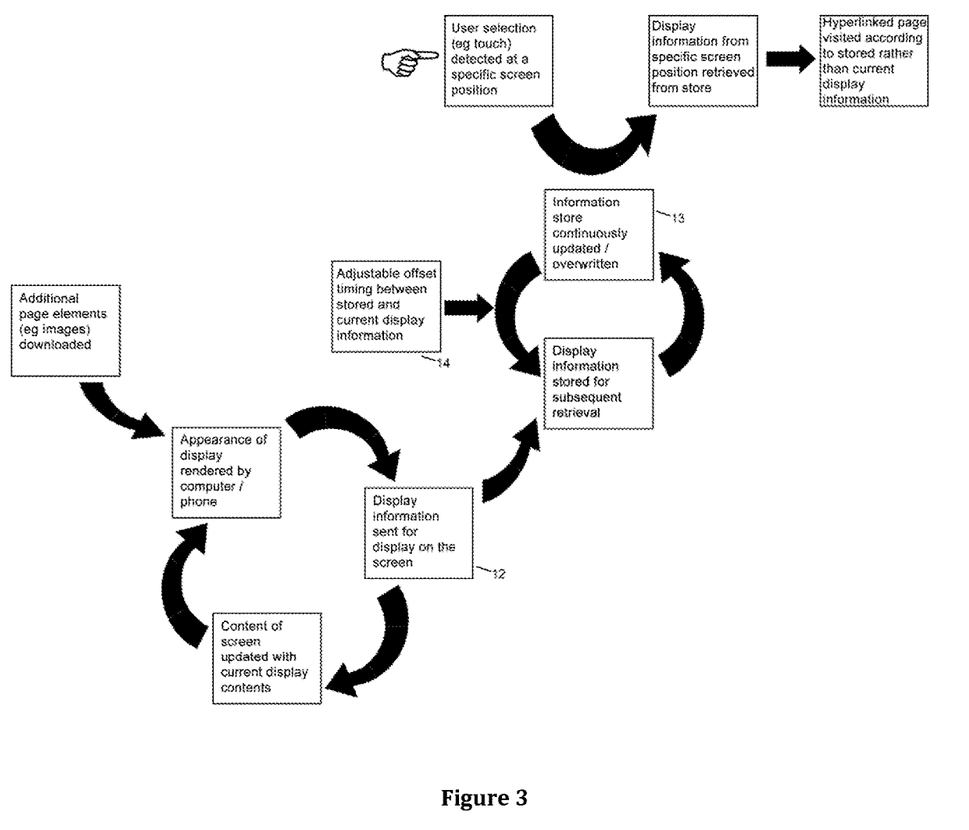
FIG. 3 shows a conceptual illustration of an embodiment of the present invention.

Turning to FIG. 3, shown therein is a conceptual illustration of a preferred embodiment of the present invention, wherein display information 12 is continuously placed into a store 13 for subsequent retrieval. The data within the store is continuously updated and overwritten by new display information. A temporal offset 14 is specified between the data within the store and the current display information. The data within the store describes the location and attributes of all page elements on the visual display at the historic point in time specified by the offset time. Upon receipt of a user selection (in the form of the touch of a finger or stylus upon a touch sensitive screen, or the click of a mouse button), the location of the user selection within the display is cross-referenced against the data in the store, and the attributes of the page element at that specific screen position as specified by the finger touch are retrieved. The browser responds as if the historic page element were selected rather than the element at that position at the moment of the actual touch. In the case of a hyperlink, the internet browser navigates to the internet page specified by the hyperlink contained at the specified screen position at a prior moment in time (specified by the offset duration) rather than to the internet page specified by any hyperlink at that specific screen location at the moment of completion of the touch movement.

Another example of an application of an embodiment the present invention in solving the problem specified above, would be a news-reading program for a mobile telephone or graphical tablet computer (such as might be offered by a newspaper for the viewing of news articles on the mobile telephone or graphical tablet computer). A problem may arise wherein a plurality of user-selectable elements, representing links to different news articles, is displayed on the screen of the device and, just before the user clicks on the link to their desired article, another user-selectable element (such as a link to visit another website to purchase an item) appears in the same location within the display as the desired link. The consequence is that the user inadvertently selects the link to the undesired website rather than the intended news article. If the time-correction specified above is applied, then the user would be directed to the link that was present on the screen at the selected location at the time when the user formed and acted upon their intention to select the link, rather than the incorrect link that subsequently became present at the selected location thereafter.

It should be noted that the same problem described above with reference to FIGS. 1 and 2 also occurs within a range of other applications, programs, telecommunications devices and other devices, wherein a user is required to make a selection from a range of user-selectable elements presented, via a user interface, within a spatial arrangement, and where the spatial arrangement varies over time. The same solution, as described above and with reference to the appended drawings and claims, is employed in alternative embodiments of the invention, where it is applicable to solving the problem within these and other devices. In this way, further embodiments of the present invention: i) provide a method and arrangement to improve the usability or accessibility of a device, the device having a user interface, the user interface containing a plurality of user-selectable elements presented in a spatial arrangement, and the spatial arrangement varying over time. The method is performed by: storing in a memory the spatial arrangement of the elements at an initial given time and, upon receiving user input at a later time, applying the user input denoting a selection within the spatial arrangement as at the initial given time stored in the memory, in order to achieve the automatic selection of the element that existed at the selected location within the spatial arrangement at a period of time before the selection was made, rather than the selection of the element that exists within the spatial arrangement at the actual time of the selection being made; where ii) the device is a) an internet browser; b) a mobile telecommunications device; c) a computer; d) an electronic device requiring a selection to be made; e) a gesture recognition device; f) a software package or program, application or script; g) a connector, or h) an adaptor.

It should be noted also that examples of programs, applications and other devices wherein a user interface requires user input and where the problem, as illustrated above with reference to FIGS. 1 and 2, is solved by embodiments of the present invention, include (but are not limited to) an internet browser, an email application, a telephone conversation application, a game application or another application or computer program, or a computer operating system, an operating system of a mobile telephone or of another electronic device.

One might at first imagine that the increasing bandwidth of internet connections (such as with the increasing availability of broadband instead of dialup connections, and with the availability of fast cellular standards such as 3G) might make the problem illustrated in FIGS. 1 and 2 less apparent, in that the faster the downloading and rendering of display elements, the more quickly the variation of any given internet page will reduce. However, in practice, with the advent of faster connection speeds and more capable telecommunications devices in terms of greater memory and/or processor speed, the problem tends to remain the same or to increase, because the complexity and size of elements within an internet page also increases over time (such as to involve elements such as streaming video and high-definition pictures that are highly demanding of bandwidth).

Furthermore, as smartphone telecommunications devices become widely adopted within an ageing population, an increased prevalence is expected of reduced reaction time, reduced speed of motor movement of fingers, hands and arms, and reductions in visual ability due to ageing; hence, compounding the problems described above and with reference to FIGS. 1 and 2.

Different Means of Adjusting the Time Duration for the Time-Correction

With reference to FIG. 3, shown therein is a conceptual illustration of an additional element within certain embodiments of the present invention, wherein the time offset duration 14 is adjustable and may be specified by the user. The user would wish to adjust the time correction, in order to correct for their own reaction time or other features of their own responding pattern, or to take into account any disability or mobility requirements, impairment in speed of responding or other relevant variables, such as reaction time changes to due to the aging process, thus improving the accessibility of the device or software to the user.

Figure 4:
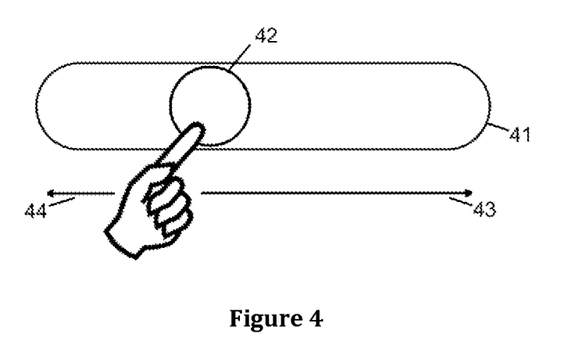
FIG. 4 shows a conceptual illustration of a slider control for adjusting the duration of time of the time-correction.

Turning to FIG. 4, shown therein is one aspect of a preferable embodiment of the present invention, wherein a slider control 41 is provided, preferably by means of being displayed on a touch sensitive screen (but in alternative embodiments being displayed on a non-touch sensitive screen, in order to be controlled using a click, or on other forms of displays, as herein described). The slider control 41 is a visual representation of an analog scale, wherein one end of the scale represents a minimum duration of time correction (preferably zero, i.e., no time correction applied), whereas the other end of the scale represents a larger duration of time correction. Preferably, a graphical element 42 (such as a graphical representation in the form of a button shape or another appropriate graphical element) is provided within the slider control to facilitate adjustment of the time correction duration. According to this embodiment, sliding the graphical element 42 in one direction 43 adjusts the value of the time correction in one direction (i.e., increasing or decreasing), whereas adjustment of the graphical element 42 in the other direction 44 adjusts the value of the time correction in the opposite direction (i.e., increasing or decreasing). According to certain embodiments of the present invention, the adjustment of the graphical element 42 is achieved through the application of the user's finger onto a touch sensitive screen, the use of a computer mouse, the movement of a stylus on a display, or through the use of other forms of visual display as herein described.

Alternative embodiments of the present invention would provide a physical slider control, switch, knob, dial, sensor, or one or more buttons, requiring physical movement, adjustment or other physical input by the user, in order to adjust the time correction.

According to certain embodiments of the present invention, the determination of the duration of the time correction is achieved by means of a default configuration that is pre-set to a previously specified duration, such as to be useful to the greatest number of users with the minimum of setup requirements. For instance, the manufacturer or programmer might utilize a value that represents a typical or average reaction time within the general population. The time correction duration could be specified by the manufacturer, programmer, marketer or retailer of the application, software, or other form of device, and furthermore certain embodiments would allow the later modification of the specified duration, such as by means of a software update to the application, software, or other form of device.

According to alternative embodiments, the user is able to directly specify a numerical value for the desired time correction duration, by means of directly entering a number, such as into a text field.

According to an alternative embodiment of the present invention, there is provided a method of automatically determining a desirable time correction duration for a particular user by means of an on-going monitoring of the behavioural performance of the user (such as by measuring the speed of responding during routine operation of the internet browser, or of other functions of the device such as the speed of selection and navigation through the various stages of the device's menu system). This would enable an appropriate time correction duration to be estimated and applied with minimum inconvenience to the user in terms of the requirement to alter configuration settings.

Figure 5:
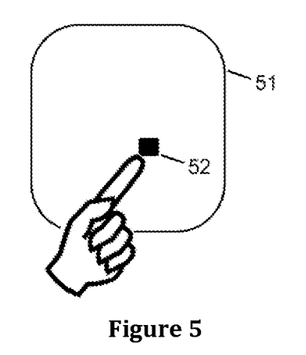
FIG. 5 shows a conceptual illustration of a calibration utility.

Turning to FIG. 5, shown therein is an alternative embodiment of the present invention wherein a configuration utility is provided, which performs an estimation of a desirable time correction duration for a particular user. It will be apparent that such a configuration utility could be presented to the user in many different forms, with the intention of measuring and/or setting the time correction to a suitable value. FIG. 5 is provided in order to illustrate an example of one form for such a utility. On a visual display 51, a target shape 52 appears, and the user is instructed to anticipate the appearance of the target shape and to touch the display screen in the location of the target shape once it appears. Preferably the configuration method includes the appearance of a number of shapes in unpredictable locations, with the user being instructed to respond as quickly as possible in each case, allowing a calculation of the average reaction time duration for that user, and hence an appropriate time correction duration. In certain embodiments the selection of the target shape occurs by means of a mouse click or by the application of a stylus to a touch sensitive screen.

It should be noted that while the configuration utility has been described above with reference to a preferable exemplar comprising display 51 and target shape 52, this description is by way of illustration, and it is to be understood that structural or functional changes to the appearance or procedure for operation of this configuration utility may be made without departing from the scope of the invention.

Further embodiments would enable the measurement of the user's ability to suppress a "previously correct" response. Such an embodiment may i) present the user with a varying pattern, sequence or arrangement of user-selectable elements; ii) instruct the user to select one or more elements according to a particular rule, pattern, or instruction; iii) change the rule, pattern, instruction, or aspects of the elements in order to make the "previously correct" response no longer correct; and iv) measure the user's ability to suppress the "previously correct" response, the speed of the suppression and the minimum length of time required for the suppression to occur.

Details of the implementation of configuration utilities as provided within certain embodiments of the present invention will now be described, with reference to FIGS. 6 and 7.

In one example, a user is presented with one or more target objects (i.e., user-selectable elements that the user is required to select, preferably being instructed to select one or more of them as quickly as possible). In certain embodiments the targets may be moving, which would have the additional benefit of making the task more challenging to the user. As indicated in FIG. 6, the computer or software would have access to information as to i) the exact time 62 at which the user makes a selection, and ii) the exact time 61 at which the object first appeared in the location selected by the user: therefore enabling the calculation of the time difference 63 between time 62 and time 61. Time difference 63 provides a measure of the reaction time of the user. Preferably, averaging the time difference over several trials as described above would result in a more accurate estimation than obtained with just one trial.

Figure 6:
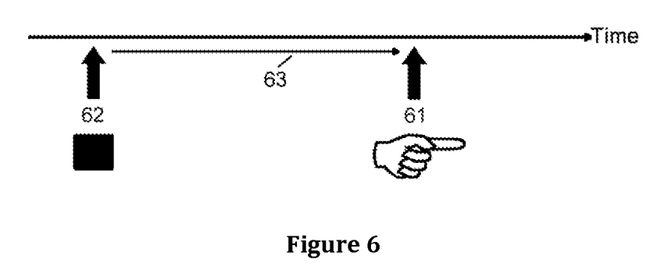
FIG. 6 shows a conceptual illustration of time duration calculations involved in an example of a calibration utility.
Figure 7:
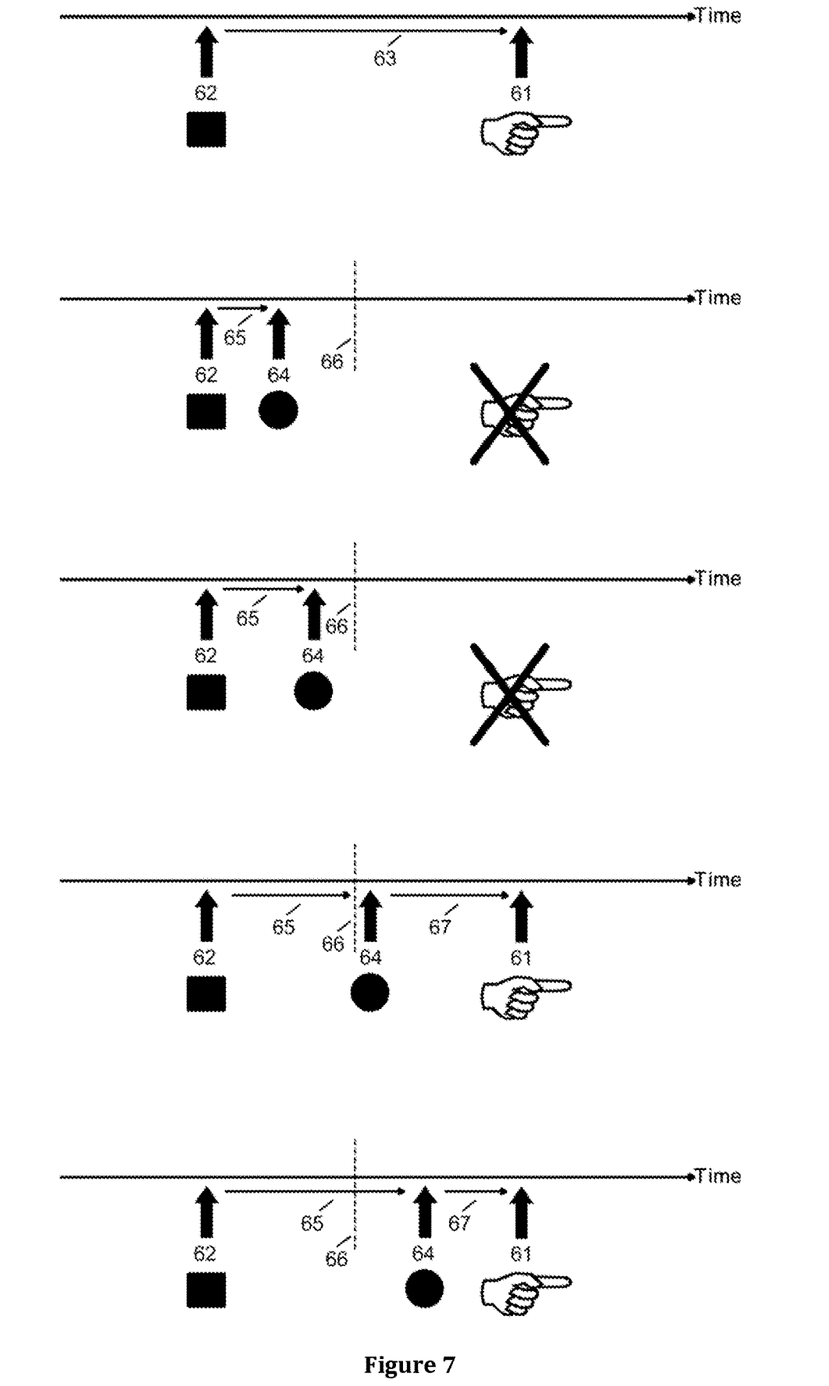
FIG. 7 shows a conceptual illustration of time duration calculations involved in an example of a calibration utility.

Turning to FIG. 7, a user is presented with one or more target objects (i.e., user-selectable elements that the user is required to select, preferably being instructed to select one or more of them as quickly as possible). In certain embodiments the targets may be moving, which would have the additional benefit of making the task more challenging to the user. In this example, the user has been provided with instructions or rules regarding qualities (such as color, shape, etc.) of the targets that they must select, and/or rules regarding qualities of targets that they must not select. They are instructed that, should the qualities of an object change after its initial appearance such as to make a previously correct selection no longer correct, then they must respond as per the new quality rather than the initial one, i.e., the user must not select an object that, while previously correct becomes no longer correct. In practice, this would mean that the user is required to inhibit or suppress their response. In the example illustrated, an example set of rules may be that the user must select squares, but is not allowed to select circles. A square is presented at time 62. In some but not all cases, the square will change to being a circle after a varying duration of time. Where there is no change to a circle, or where the change happens after a longer period of time than the user's reaction time duration 63 (as described above with reference to FIG. 6), then the user will make their selection at time 61.

With further reference to FIG. 7, where the change to a circle happens after a very short duration of time, the user succeeds in terminating their response (for instance, they may quickly withdraw their hand from the controller, mouse, or touch-sensitive screen with which the selection was meant to have been made). Because the computer or software has access to the exact times at which i) the object appeared (time 62); and ii) the object changed from being a square to a circle (time 64): it is possible to calculate the time difference 65 between time 64 and time 62.

As the programmed computer or software progressively increases the time difference 65, by means of making the object change from a square to a circle at progressively later times 64, a situation is reached, wherein an important phenomenon occurs: wherein time difference 65 increases beyond what may be described as a "point of no return" 66, wherein the user is unable to successfully inhibit or prevent the completion of their response (for instance, the tip of their responding finger may have attained such momentum, or have reached such a near proximity to the responsive surface, such as to be, in effect, unstoppable by the user). An alternative way of illustrating the phenomenon would be to consider that the instruction (a motor command) to move a particular muscle had already been initiated by the user's brain, and was already unstoppably on its journey from the brain to the muscle at the point in time when the target object changed in its quality.

Through the repeated presentation of objects with varying times 65 until change in quality, it becomes possible to determine, for that user, the maximum time difference 67 (calculated as the difference between time 61 and time 64) that succeeds in overcoming the user's attempt to suppress their incorrect response. In the same way it is possible to calculate the maximum time difference 65, wherein the user is still able to suppress their response (with the maximum time difference 65 being an estimation of that user's "point of no return" 66).

An advantage conferred by embodiments of the present invention that provide for a determination of "point of no return" as above, is that they enable the setting of the time-correction duration to a shorter time duration than the user's reaction time 63: thereby conferring two possible advantages. Firstly, that the user is still required remain vigilant and to actively try to suppress selections that subsequently become incorrect (to a sufficient extent as to prevent the user from becoming complacent or inattentive in their use of the device, but while still protecting the user from situations where they are unable to suppress their response even with best efforts). Secondly, another advantage would be to reduce the time duration over which data must be stored, and therefore reduce the amount of memory that must be committed to the storage of the data.

A feature of certain embodiments of the present invention is that the setting of the time-correction duration to different lengths of time, such as i) the reaction time duration 63 in FIG. 6; or ii) the maximum time difference 67 in FIG. 7 between the time 66 of the "point of no return" and the time 61 of the selecting of an object: will result in the conferring of different degrees of responsiveness and intuitiveness of use to the user-interface, wherein different time-correction durations may feel particularly intuitive to different users, dependent upon their individual preferences.

Certain embodiments would contain provision for a configuration utility to be presented in the format of a game, or embedded within a game or other application or software, in order to make the performing of the configuration more engaging and fun for the user, and to reduce any annoyance or inconvenience that may be otherwise felt by a user who is required to undertake configuration of an application or device. Through such means, the requirement of the user to study lengthy instructions regarding the operation of the configuration utility would be reduced, making the device more intuitive to use and more suitable for users less able to read fine print or to follow complicated instructions.

Different Means of Presenting User-Selectable Elements to a User

Additional embodiments of the present invention relate to devices wherein a spatial arrangement of user-selectable elements is presented on: i) a television screen; ii) a computer display screen; iii) a computer graphical tablet, such as a "tablet computer"; iv) a display screen of a mobile telephone; v) a display screen of a hand-held electronic device; vi) another surface, by means of projection (such as via a data projector or a lamp, LED or laser); or vii) a wall-mounted display screen. With the development of display technologies involving the measurement of gestural or other responses within free space (such as by means of video cameras and the real-time processing of facial expressions and gestures), it is increasingly possible to provide user-selectable elements within free space, and to assist the user in visualizing the arrangement of elements within the free space by means of the holographic projection of data or visual elements. Further embodiments of the present invention therefore relate to devices wherein a spatial arrangement of user-selectable elements is: i) presented within free space, such as by holographic projection; or ii) is arranged as a virtual arrangement within free space, where no visual display is immediately apparent but wherein the user requires to imagine or recall the arrangement.

Different Means of Obtaining User Input

Additional embodiments of the present invention relate to devices wherein user input (in order to select a user-selectable element) is achieved by means of: i) a computer mouse, trackball, joystick or user-tiltable button (sometimes referred to as a "nipple" device as provided on some computer equipment); ii) a computer keyboard; iii) a touch-sensitive screen; iv) a stylus (such as applied onto a touch-sensitive screen); v) a wireless, infra-red or radio communication between a device, screen or display and a hand-held controller, or device otherwise attached to, held by or otherwise in contact with the body or a part thereof; vi) a voice command (for example, wherein spoken commands are received as audio samples, and are compared against a plurality of previously defined audio samples corresponding to different commands, in order to enable navigation through a spatial arrangement or a menu structure); vii) a gesture or movement of the finger, hand, face, the body or any part thereof; viii) the movement or adjustment of any device or object attached to, held by or otherwise in contact with the body or a part thereof; ix) a movement within an area of free space; or x) a movement within an area of free space, rather than directly onto a display screen (such as the selection of a location within a holographically projected display within free space).

Different Means of Storing Data

A range of media and devices may be utilized to carry and store computer data, and accordingly certain embodiments of the present invention employ storage of the spatial arrangement of user-selectable elements within a memory, wherein the storage is achieved by means of: i) a computer memory; ii) a data buffer; iii) semiconductor memory; iv) virtual memory; v) protected memory; vi) disk storage; vii) electro-magnetic data storage; viii) random access memory; ix) an online "cloud-based" data store (including online storage wherein such a data store may comprise data held in a remote server, computer, hard-disk or database); x) a digital store; or xi) a cache.

Different Means of Managing Data Within a Data Store

With reference to element 13 within FIG. 3, one embodiment of the present invention includes a store of data wherein the contents of the store are continually updated and replaced. This may be desirable in order to limit the amount of storage space or memory required in order to store the information relating to the spatial arrangement of user-selected elements at previous points in time. The importance of storage space is illustrated by the fact that, all other factors being equal, the greater the amount of storage space that may be committed to forming the store, the greater the duration of time for which information may be continuously stored, and hence the greater the time-correction that may be applied. Furthermore, the greater the amount of storage space that may be committed to forming the store, the greater amount of data relating to each time-point that may be stored; i.e., the greater the complexity of the spatial arrangement that may be adequately represented by the store, and/or the greater the spatial resolution of sampled information relating to the spatial arrangement that may be stored. Certain embodiments of the present invention therefore provide for the store of data to be: i) continuously updated and replaced (wherein a means for achieving this may involve a first-in-first-out buffer configuration); ii) continuously stored, and deleted or overwritten automatically (such as after the passage of a determined time duration, after which the stored data is deemed to be no longer required); or iii) continuously stored without being actively deleted (such as where very large amounts of storage space or memory may be committed to forming the data store, or where it is advantageous to retain information within the store of data for surveillance, security or other monitoring or audit purposes).

In the foregoing specification, specific embodiments and applications have been described. However, one of ordinary skill in the art appreciates that various modifications and changes can be made without departing from the scope of the invention as set forth in the claims below. For example, the disclosed method and arrangement can be used in military hardware and/or software, within touchscreen and other human-machine interface devices, in order to improve the accuracy of (and/or increase the speed of and/or decrease errors in) target selection, in handheld, mobile or fixed, as well as sea-, air- or land-based installations. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

I claim:

1. A method of improving the usability or accessibility of a device having a user interface that contains a plurality of user-selectable elements presented in a spatial arrangement that varies over time due to movement of at least one of the elements from one position to another position on the user interface, the method comprising:

storing, in a memory, the spatial arrangement of the elements at an initial given time;

upon receiving user input at a later time, applying the user input denoting a selection within the spatial arrangement as at the initial given time stored in the memory, in order to achieve the automatic selection of the element that existed at the selected location within the spatial arrangement at a period of time before the selection was made, rather than the selection of the element that exists within the spatial arrangement at the actual time of the selection being made;

calibrating a duration of the period of time by operation of a configuration utility designed to measure the user's performance, the configuration utility moving the at least one of the elements within a visual display, the user being required to select the at least one moving element according to at least one rule regarding visual qualities of the at least one moving element, the user also being required to try to inhibit their response, should the visual qualities of the at least one moving element change in the time between its initial appearance and its selection by the user, the change in the visual qualities occurring at a varying time-point following its initial appearance so that the user must not select them;

the device having access to the exact time at which the at least one moving element first appeared at a given location, the exact time at which the at least one moving element changed in its visual qualities, the exact time at which the user made their response if the user was unable to suppress it, and to information as to whether or not the user selected the at least one moving element whether or not they were able to inhibit their response;

calculating the difference between the time of selection and the time of change in visual qualities; and investigating the maximum time difference that succeeds in preventing the user from inhibiting their response.

2. The method as claimed in claim 1, wherein the device is one of an internet browser, a mobile telecommunications device, a computer, an electronic device that requires a selection to be made, a gesture recognition device, a software package, program, application, and script, a connector, and an adaptor; and wherein the user interface forms part of one of an internet browser, an email application, a telephone conversation application, a game application, another application, a computer program, a computer operating system, and an operating system of a mobile telephone or of another electronic device.

3. The method as claimed in claim 1, wherein the spatial arrangement of user-selectable elements is presented on one of a television screen, a computer display screen, a computer graphical tablet, a display screen of a mobile telephone, a display screen of a handheld electronic device, a projection display surface, a wall mounted display screen, and as a holographic projection within free space.

4. The method as claimed in claim 1, wherein the user input is achieved by means of one of a computer mouse, trackball, joystick, user-tiltable button, a computer keyboard, a touch-sensitive screen, a stylus, a wireless, infra-red or radio communication link, a voice command, a gesture or movement of the finger, hand, face, body or any part thereof, a movement or adjustment of any device or object attached to, held by or otherwise in contact with the user's body or a part thereof, and a movement within an area of free space.

5. The method as claimed in claim 1, wherein the storing is performed by one of a computer memory, a data buffer, a semiconductor memory, a virtual memory, a protected memory, a disk storage, an electro-magnetic data storage, a random access memory, an online cloud-based data store, a digital store, and a cache.

6. The method as claimed in claim 1, wherein the storing is performed by one of continuous updating and replacement; a first-in-first-out buffer configuration; continuous storage, deletion and automatic overwriting; and continuous storage without active deletion.

7. The method as claimed in claim 1, and setting a duration of the period of time by a default configuration that is pre-set to a previously specified duration by one of a manufacturer, programmer, marketer or seller of the device.

8. The method as claimed in claim 1, and setting an adjustable duration of the period of time by the user.

9. The method as claimed in claim 1, and setting an adjustable duration of the period of time using one of a slider control display on a display screen, and a physical slider control manually controllable by the user.

10. The method as claimed in claim 1, and calibrating a duration of the period of time by one of an automatic estimation of the user's optimum time correction setting, and an automatic monitoring of the user's performance while using the device.

* * * * *